United States Patent

[11] 3,579,268

| [72] | Inventor | Richard J. Steiger<br>Berkeley, Calif. |
|---|---|---|
| [21] | Appl. No. | 743,555 |
| [22] | Filed | July 9, 1968 |
| [45] | Patented | May 18, 1971 |
| [73] | Assignee | Ampex Corporation<br>Redwood City, Calif. |

[54] AUTOMATIC QUADRATURE AND AMPLITUDE STABILIZER
5 Claims, 3 Drawing Figs.

| [52] | U.S. Cl. | 235/189,<br>235/186, 328/166 |
|---|---|---|
| [51] | Int. Cl. | G06g 7/22 |
| [50] | Field of Search | 235/189,<br>186, 190, 191, 192; 318/20.515; 328/165, 166,<br>167 |

[56] References Cited
UNITED STATES PATENTS

| 3,028,504 | 4/1962 | Close | 235/189(X) |
|---|---|---|---|
| 3,241,077 | 3/1966 | Smyth et al. | 328/165 |
| 3,270,189 | 8/1966 | Cook | 235/189 |
| 3,358,129 | 12/1967 | Schultz | 235/189((X) |
| 3,384,738 | 5/1968 | Warrick, Jr. | 235/189 |
| 3,411,093 | 11/1968 | Gaylor | 328/165(X) |
| 3,414,823 | 12/1968 | Knox | 328/166(X) |

*Primary Examiner*—Malcolm A. Morrison
*Assistant Examiner*—Joseph F. Ruggiero
*Attorney*—Robert G. Clay

ABSTRACT: A network adapted to receive two phase related signals and generate two responsive quadrature related signals. One received signal serves as a reference. A servocontrolled percentage of the reference signal is mixed with the other received signal to form a resultant third signal which is quadrature relative to the reference signal.

Patented May 18, 1971
3,579,268
2 Sheets—Sheet 1
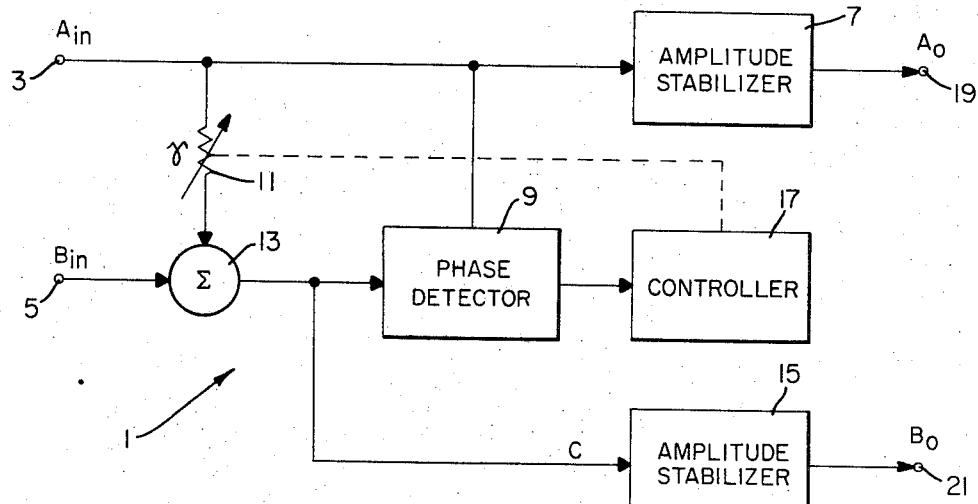
FIG_1
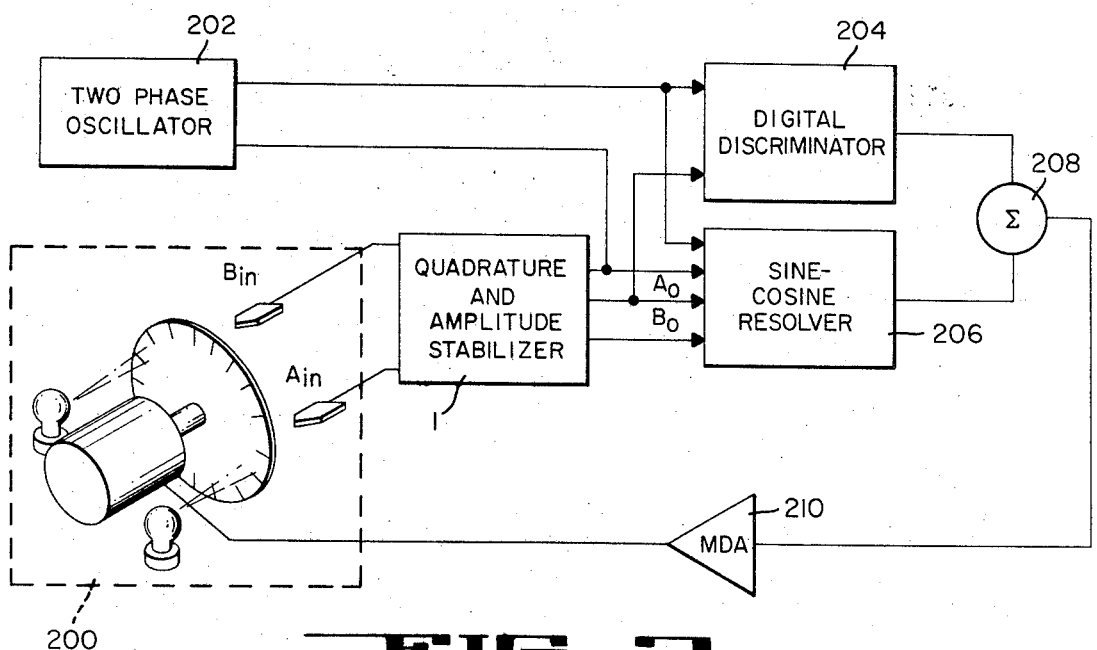
FIG_3
INVENTOR.
RICHARD J. STEIGER
BY Thomas E. Schatzel
ATTORNEY

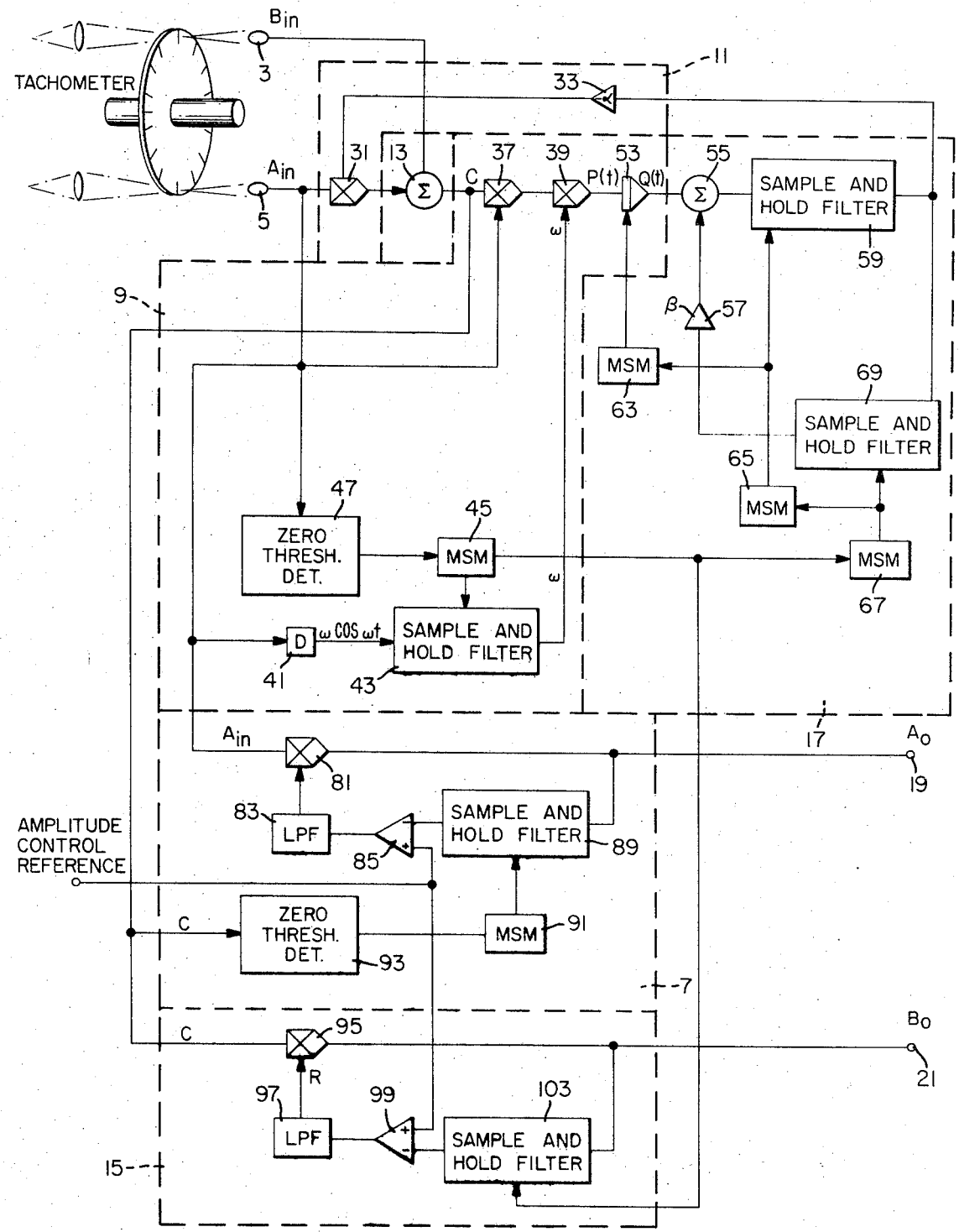
FIG_2

AUTOMATIC QUADRATURE AND AMPLITUDE STABILIZER

The invention described herein was made in the performance of work under a NASA contract and is subject to the provisions of Section 305 of the National Aeronautics and Space Act of 1958, Public Law 85—568 (72 stat. 435; 42 U.S.C. 2457).

BACKGROUND OF THE INVENTION

The present invention relates to a network in which two periodic signals, out of phase with relationship to each other, may be received and two quadrature related signals with fixed amplitudes generated.

Though those skilled in the art will recognize various applications for the present invention, one embodiment and application provides quadrature related signals for servospeed and phase control systems utilizing sine-cosine resolvers. Such a speed and phase control system is described in copending U.S. Pat. application, Ser. No. 743,530 by Herman A. Ferrier, Jr., entitled "Low Speed Phase-Lock Servo Control System," filed on July 9, 1968. As described in said application, it is desirable to have two quadrature related signals indicative of the shaft velocity and shaft position of a device being controlled. Highly accurate operation of such resolvers requires accurately maintained amplitudes and quadrature of the two-phase outputs originating with the controlled device. Commonly, an optic tachometer comprising a pair of optical assemblies consisting of an optical disc, light sources, photocells, associated lenses and mirrors are utilized to detect the shaft position. The tachometer generates two periodic signals of approximately 90 electrical degrees phase difference. Disadvantages of the optical system are that it is frequently a difficult and tedious task to optomechanically adjust the relative phase of the two signals to be precisely 90 electrical degrees. Also, during operation there may be physical vibrations, temperature variations, etc., of the tachometer such that the static relative phase between the pickups vary. Without compensation or correction, errors may appear on the generated signals due to the variations in the position of the sensors.

SUMMARY OF THE INVENTION

The present invention centers about an electronic network for overcoming these shortcomings and is capable of receiving two periodic signals out of phase with relationship to each other and generate two quadrature related signals. The network of the present invention is adapted to receive two phase related signals, which for purposes of discussion may be designated A and B and of a sinusoidal format. Using one signal as a reference, e.g., A. a servocontrolled percentage of A is mixed with B to form a resultant signal C. The signal C is then received by a detecting network such that the undesired components of signal A remaining in C may be correlation-detected against the reference signal. This information is used to control the percentage of A mixed with B to reduce the component of signal A in signal C to zero. The signals A and C may be processed through stabilizing circuitry for leveling their amplitudes to a desired amount.

The electrical signal system of the present invention minimizes the mechanical adjustments otherwise necessary between two sensors positioned to generate signals of a precise degree of phase difference. With the present network the fine positional adjustments between the sensors are made automatically and rapidly with electronic techniques. Also, as employed in a multiple-speed servocontrol system such as frequently desired in the magnetic tape recorder art, the network provides for correction of phase errors over a wide frequency (speed) range, prompt stabilization after a frequency or relative phase change, and amplitude stabilization of the resultant signals to an external reference voltage. It may further be utilized to provide precise discriminator (frequency) and zero-crossing information at auxiliary outputs.

BRIEF DESCRIPTION OF THE DRAWINGS

FIG. 1 illustrates a generalized block diagram of the network in accord with the present invention;

FIG. 2 illustrates a generalized circuit diagram of a stabilizer network of the present invention; and FIG. 3 illustrates a generalized block diagram of the incorporation of the stabilizer network of the present invention along with a sine-cosine resolver network for servocontrolling a rotating member, e.g., electrical driving motor.

DESCRIPTION OF THE PREFERRED EMBODIMENT

FIG. 1 illustrates a generalized and simplified block diagram of the stabilizer network according to the present invention and referred to by the general reference character 1. The block diagram receives first and second input signals designated $A_{in}$ and $B_{in}$ of which there is an electrical phasor difference. The two input signals are received by a pair of input terminals 3 and 5. The input terminal 3 extends to an amplitude stabilizer stage 7. The input terminal 3 also branches off into alternative parallel paths one of which extends to a phase detector stage 9 and the other of which extends to an adjustable variable 11 indicated as a variable resistance. The variable 11 extends to a summer stage 13 which also receives the $B_{in}$ signal. The output of the summer 13 extends to the phase detector 9 and to an alternate path including an amplitude stabilizer stage 15. The phase detector 9 extends to a controller stage 17 responsive to the output of the detector 9. The controller 17 is coupled to the variable resistance 11. The amplitude stabilizers 7 and 15 extend to a pair of output terminals 19 and 21 also designated $A_o$ and $B_o$.

For a brief explanation of the theoretical operation of the present system and referring to FIG. 1, the $A_{in}$ signal may be considered the reference. The signal $A_{in}$ amplitude stabilized by the stabilizer network 7 to get an output signal $A_o$ at the terminal 19. Before stabilization a certain percentage $\gamma$ of the $A_{in}$ signal is added to the $B_{in}$ signal at the summer 13. This results in a third signal C comprising parts of $A_{in}$ and $B_{in}$. Signal C is received by the phase detector 9 and amplitude stabilizer 15. The component of $A_{in}$ of the signal C is correlation detected against the $A_{in}$ signal by the phase detector 9. The detector provides a resultant command signal to the controller 17 indicative of the degree of the reference signal $A_{in}$ in the signal C. A component of $A_{in}$ in the signal C is servoed to zero by control of the variable 11 through the controller 17. Thus, the signal C has no component of $A_{in}$ such that the $A_o$ and $B_o$ signals are quadrature related. The amplitude stabilizers 7 and 15 provide the desired amplitude stabilization.

A more detailed diagram of the stabilizer of FIG. 1 is illustrated in FIG. 2. In FIG. 2 the circuitry representative of the block diagrams of FIG. 1 are indicated within the broken line diagram and numbered the same as they are in FIG. 1, as closely as possible. A multiplier 31 receives the $A_{in}$ signal and a feedback signal from an operational amplifier 33. The summer 13 receives the output of the multiplier 31 and the $B_{in}$ signal. The summer 13 output is received by a multiplying means including a pair of multipliers 37 and 39. The multiplier 37 also receives the $A_{in}$ and C signals. The multiplier 39 receives the product of the multiplier 37 and another signal $\omega$ originating with the $A_{in}$ signal. The $A_{in}$ signal is received by a differentiator 41 extending through a sample and hold filter 43. The filter 43 is opened by a "marker" or monostable multivibrator 45 responsive to a zero threshold detector 47 receiving the $A_{in}$ signal. The output of the filter 43 is proportional to the input frequency $\omega$ of $A_{in}$ and hence when used for servocontrol to the rotating velocity of the controlled device, it is fed to the second input of the previously mentioned multiplier 39.

The multiplier 39 provides a signal designated $P(t)$ and extends to an integrator network 53 which in turn provides an output designated $Q(t)$ to a summer 55. The summer 55 also receives a signal from an operational amplifier 57 to add to the integrated signal. The output of the summer 55 extends to a sample and hold filter 59 extending through the operational amplifier 33 back to the multiplier 31. The integrator 53 is controlled by a "marker" or monostable multivibrator 63. The marker 63 is tied to another marker 65 tied in turn to a third marker 67 joining the marker 45. The junctions of the markers 65 and 67 are common to a sample and hold filter 69 which extends to the sample and hold filter 59 and the operational amplifier 33. The marker 65 is also common to the sample and hold filter 59.

The amplitude stabilizer 7 for $A_{in}$ includes a multiplier stage 81 extending to the $A_o$ output terminal 19. The multiplier 81 is tied to a low-pass filter network 83 in turn tired to a differential amplifier 85. The differential amplifier receives on one input terminal an amplitude control reference potential. At the other input terminal the differential amplifier is tied to a sample and hold filter 89 having one terminal common to the $A_o$ terminal 19. The filter 89 is controlled by a marker or monostable multivibrator 91 tied to a zero-threshold detector network 93. The zero-threshold detector 93 is tied to the output of the summer 13 such that the amplitude of $A_{in}$ is controlled at its peaks which occur simultaneously with the zero crossing of the signal C.

The output of the summer 13, i.e., signal C, is also tied to the amplitude stabilizing network 15 including a multiplier 95 extending to the $B_o$ terminal 21. The multiplier 95 is tied to a low-pass filter 97 in turn tied to a differential amplifier 99. One terminal of the differential amplifier 99 is tied to the amplitude control reference source while the other terminal is tied to a sample and hold filter 103. The filter 103 is controlled by the marker or monostable multivibrator 45 and to the $B_o$ terminal 21. The filter 103 responds to the zero crossings of the $A_{in}$ signal which occur at the peak of the signal C. The amplitude control reference value determines the desired amplitude level.

A theoretical analysis of the operation of the network of FIG. 2 may assume that the $l$ represents a uniform angular velocity of a tachometer and that $l = \omega t$. Disregarding amplitude and initial phase, the signals $A_{in}$ and $B_{in}$ generated by the tachometer may be viewed as $A_{in} = \sin\omega t$ and $B_{in} = \cos(\omega t + \theta)$, where $\theta$ is the quadrature error between $A_{in}$ and $B_{in}$. $A_{in}$ is multiplied by the factor $\gamma$ through the multiplier 31 and added to $B_{in}$ through the summer 13 to get a signal $C = \gamma A_{in} + B_{in}$. C is then multiplied by $A_{in}$ through the multiplier 37. There is also a signal proportional to $\omega$ representing the input angular frequency generated by the discriminator consisting of circuit differentiator 41 and the filter 43. The differentiator 41 differentiates $A_{in}$ to get $\omega \cos\omega t$. The filter 43 is gated by the zero threshold detector 47 and monostable multivibrator 45 such that $\omega \cos\omega t$ is sampled at the positive-slope zero-crossing of $A_{in}$ where $\cos\omega t = 1$, getting $\omega$. The signal $\omega$ may then be passed to the multiplier 39. Thus, the multiplier 39 generates a signal $P(t) = \omega < ^A_{in} C$.

Meanwhile, pulses produced by the multivibrator 45 marking the positive-slope zero-crossing of $A_{in}$ drive the timing string of monostable multivibrators 67, 65 and 63. The multivibrator 67 fires for a brief period, then resets and fires the multivibrator 65 which in turn fires for a brief period, then resets and fires the multivibrator 63. The multivibrator 63 resets the integrator 53 very nearly at the beginning of $A_{in}$'s period. Then the signal $P(t)$ is integrated until the end of $A_{in}$'s period and producing signal $Q(t)$. The signal $Q(t)$ is sampled and accumulated through the summer 55. Analyzing the operation of the integrator 53 mathematically and taking $A_{in}$ as the reference, $$A(t) = \int_0^t P(t)dt$$
$$= \int_0^t \omega A_{in}(t)[\gamma A_{in}(t) + B_{in}(t)]dt$$

and $$Q(t) = \omega \int_0^t \gamma \sin^2 \omega t\, dt + \omega \int_0^t \sin \omega t \cos(\omega t + \theta)dt$$

Expanding $\cos(\omega t + \theta) = \cos\omega t \cos\theta - \sin\omega t \sin\theta$ and letting $t = T = 2\pi/\omega =$ the next sampling instant, $$Q(T) = \omega\gamma \int_0^t \sin^2 \omega t\, dt + \omega \cos\theta \int_0^t \sin \omega t \cos \omega t\, dt$$
$$- \omega \sin\theta \int_0^t \sin^2 \omega t\, dt$$

and $$= \omega(\gamma - \sin\theta) \int_0^t \sin^2 \omega t\, dt + \omega \cos\theta \int_0^t \sin \omega t \cos \omega t\, dt$$

Assuming $$\int_0^t \sin \omega t \cos \omega t\, dt \text{ goes to zero,}$$

then $$Q(T) = \pi(\gamma - \sin\theta)$$

The definite integral as represented by the last expression indicates the amplitude of the $\sin \omega t$ component of signal C which is to be eliminated. Instead of simply sampling and holding $Q(t)$, through the summer 55 is added a certain multiple $\beta$ of the last held value $P_0$, of the signal received from the filter 69. The sum from the summer 55 is then passed through the sample and hold filter 59 to "update the sum." Thus, the output from the network 59, signified is: $P_1$ $$P_1 = Bp_0 + Q(T)$$

After the monostable 45 resets and sets monostable 67, the sample and hold filter 69 now samples and holds $P_1$ which will be used to calculate $P_2$ in exactly the same manner as above, namely $$P_2 = BP_1 + Q(2T)$$

If necessary, there may be additional sample and hold networks. The result of the sampling, weighting, adding, resampling, etc., is to perform an approximate integration of the errors $Q(nT)$ to get $P_n$. The integration is performed discretely or "digitally" so that there is the equivalent of a tracking low-pass filter, i.e., one whose characteristics track the input frequency. This is necessary to avoid having to switch in different time constants for different speed ranges. Finally, $P_n$ is multiplied by $\alpha, \alpha > 0$ to get $\gamma$, therefore $$\gamma = -\alpha P_n$$

is chosen as large as possible to ensure quick settling of $Q(nT)$ to zero, but must be kept small enough to prevent instabilities.

Both the signals C and $A_{in}$ may have some amplitude fluctuations which though not necessarily large enough to affect the dynamics of the quadrature stabilizer, may be undesirable to the load, e.g., sine-cosine resolvers. Thus, the present network provides amplitude stabilization. At the positive-slope zero-crossing of $A_{in}$, i.e., where multivibrator 45 fires, signal C is maximum. The amplitude of C times a correction factor R are sampled at the sample and hold filter 103 at the command of the monostable multivibrator 45, and this "corrected" amplitude is voltage compared with the amplitude control reference in the differential comparator 99. Any error is integrated in the low-pass filter 97 to correct R and then supplied to the multiplier 95 where the error signal and the signal C are combined. A similar process is used to stabilize $A_o$. This utilizes the zero-threshold detector 93 receiving signal C and the sample and hold filter 89 operating under the command of the monostable 91. The multiplier 81 serves as a combine means for combining the error signal from the filter coinciding and the $A_{in}$ signal.

FIG. 3 generally illustrates the association of the present invention with a servocontrol system as described in the previously mentioned patent application of Herman A. Ferrier, Jr. An optical tachometer assembly with a capstan motor is generally illustrated within the block 200 generates the two periodic signals $A_{in}$ and $B_{in}$. These signals are received by the quadrature and amplitude stabilizer network 1 of the present invention. The network 1 provides the two quadrature related signals $A_o$ and $B_o$ representative of the actual velocity and phase of the capstan motor. A two-phase oscillator 202 generates two sinusoidal quadrature related signals of a frequency coinciding with the desired velocity of the capstan. One signal from the stabilizer 1 and one signal from the oscillator 202 are received by a digital discriminator 204 to determine whether or not there is velocity lock between the actual and desired capstan speeds. The outputs of the oscillator 202 and stabilizer 1 are also received by a sine-cosine resolver network 206. The outputs of the discriminator 204 and resolver 206 are received by a summer network 208 controlling a motor drive amplifier 210 extending to the capstan motor. When there is no velocity lock, the output of the discriminator 204 is the dominating signal and where there is velocity lock the output of the resolver 206 is dominating to provide phase lock.

I claim:

1. A quadrature stabilizer network adapted for receiving two periodic input signals and providing two quadrature related output signals comprising, in combination: input terminal means for receiving a pair of periodic input signals, a first signal of said pair having a phase differential relative to the second signal of said pair; adder means for receiving said second signal and a percentage of said first signal, the adder issuing a third signal comprising components of both said first and second signals; phase detector means receiving said third signal and said first signal, the detector means issuing a command signal indicative of the undesired portion of said first signal within said third signal; controller means responsive to the command signal and controlling the percentage of said first signal provided to the adder means; output terminal means connected to receive the first input signal and the third signal and issuing first and second output signals in response thereto; a pair of amplitude stabilizers for sensing and controlling the amplitude of the first and second output signals with respect to an external amplitude control reference source, a first of said stabilizers connected to receive the first signal and a reference signal from said source, and a second of said stabilizers connected to said adder means to receive the third signal and the reference signal from said source, differential comparator means associated with each each said stabilizer, sampling means connected to receive said first and second output signals and having outputs individually issuing the sampled levels of each such signal, the comparator means associated with the first stabilizer connected to receive the reference signal and connected to the output of said sampling means to receive the sampled level of the first output signal, and the comparator means associated with the second stabilizer connected to receive the reference signal and connected to the output of said sampling means to receive the sampled level of said second output signal, each said comparator means having an output issuing a signal representing an amplitude difference between the reference signal and the respective sampled signal levels; and multiplier means connecting said first input signal and the third signal to said output terminal means for providing said first and second output signals and said multiplier means being connected to the outputs of said comparator means for adjusting the amplitudes of said output signals in response to the amplitude difference signals.

2. A quadrature stabilizer network adapted for receiving two periodic input signals and providing two quadrature relates output signals comprising, in combination: input terminal means for receiving a pair of periodic input signals, a first signal of said pair having a phase differential relative to the second signal of said pair; adder means for receiving said second signal and a percentage of said first signal, the adder means issuing a third signal comprising components of both said first and second signals; phase detector means receiving said third signal and said first signal and issuing a command signal representing an undesired portion of said first signal within said third signal, said detector means having multiplying mean receiving said first input signal and said third signal and a signal representing the angular frequency of said first input signal and said multiplying means having an output issuing a signal representing the product of such signals, electrical integrator means connected to the output of said multiplying means and integrating said signal representing said product over a one time period of said first input signal and said integrator means having an output issuing a signal representing said integral and corresponding to the proportion of said first input signal in said third signal; controller means responsive to the output of said integrator means of said phase detector means for controlling said percentage of said first input signal received by said adder means; and output terminal means connected to receive said first input signal and said third signal and providing said quadrature related output signals in response thereto.

3. The network of claim 2 in which the signal representing the angular frequency of the first input signal is generated by a circuit comprising a differentiator network receiving the first input, a sample and hold filter connected to said network to receive the differentiated signal therefrom and gating means responsive to the zero crossings of the first input signal and being connected to issue a gate signal to and for actuating said sample and hold filter.

4. The network of claim 2 in which the controller means comprises, a summer extending to the integrator means and to a first sample and hold network responsive to the zero crossings of the first signal and issuing a signal indicative of the command signal during a preceding time period, a second sample and hold network responsive to the zero crossings of the first signal and being connected to the summer, the output of said second sample and hold network controlling an operational amplifier connected to the adder means.

5. The network of claim 4 further including a pair of amplitude stabilizers for sensing and controlling the amplitude of the first and second output signals, a first of said stabilizers receiving the first signal and said reference signal, and the second of said stabilizers receiving the third signal and said reference signal, differential comparator means associated with each stabilizer, the comparator means associated with the first stabilizer receiving the reference signal and a sampling of the first output signal and the comparator means associated with the second stabilizer receiving the reference signal and a sampling of the second output signal, each said comparator means providing an error signal representing the amplitude differential between the reference signal and the received sampling, multiplier means associated with each stabilizer receiving the associated first or third signals and the error signals whereby the first and second output signals are each stabilized to the level of said reference signal.